(12) United States Patent
Keller

(10) Patent No.: US 10,838,981 B2
(45) Date of Patent: Nov. 17, 2020

(54) DATABASE OPTIMIZATION USING SPECIAL PARTITION SPECIFICATIONS FOR REPLICAS

(71) Applicant: SAP SE, Walldorf (DE)

(72) Inventor: Friedrich Keller, Walldorf (DE)

(73) Assignee: SAP SE, Walldorf (DE)

( * ) Notice: Subject to any disclaimer, the term of this patent is extended or adjusted under 35 U.S.C. 154(b) by 250 days.

(21) Appl. No.: 15/690,961

(22) Filed: Aug. 30, 2017

(65) Prior Publication Data

US 2019/0065573 A1    Feb. 28, 2019

(51) Int. Cl.
*G06F 16/27* (2019.01)
*G06F 16/2453* (2019.01)
*G06F 16/2455* (2019.01)

(52) U.S. Cl.
CPC ........ *G06F 16/278* (2019.01); *G06F 16/2453* (2019.01); *G06F 16/2455* (2019.01)

(58) Field of Classification Search
CPC ..................................................... G06F 16/278
USPC ........................................................ 707/635
See application file for complete search history.

(56) References Cited

U.S. PATENT DOCUMENTS

| | | | |
|---|---|---|---|
| 2015/0058351 A1* | 2/2015 | Brand | G06F 16/2228 707/741 |
| 2015/0088813 A1* | 3/2015 | Lahiri | G06F 16/21 707/609 |
| 2016/0203050 A1* | 7/2016 | Hrle | G06F 11/1402 707/625 |
| 2017/0116237 A1* | 4/2017 | Zhang | G06F 16/254 |
| 2017/0270149 A1* | 9/2017 | Grosman | G06F 16/2358 |

* cited by examiner

*Primary Examiner* — Syling Yen
(74) *Attorney, Agent, or Firm* — Schwegman Lundberg & Woessner, P.A.

(57) ABSTRACT

A method of modifying a database architecture to improve database performance is disclosed. A replication database table is generated from an original database table. The original database table is divided into a first plurality of partitions optimized for handling accesses for satisfying a first type of query. The replication database table is divided into a second plurality of partitions optimized for handling accesses for satisfying a second type of database query. Based on receiving the database query of the first type, the query of the first type is routed to one host of a plurality of hosts to satisfy the query, the one host hosting one of the first plurality of partitions; based on receiving the database query of the second type, the query is routed to the same or another host of the plurality of hosts to satisfy the query, the second host hosting one of the second plurality of partitions.

20 Claims, 9 Drawing Sheets

DATABASE OPTIMIZATION USING SPECIAL PARTITION SPECIFICATIONS FOR REPLICAS

TECHNICAL FIELD

The present disclosure generally relates to database performance improvements and, in one specific example, to creating a replica of a distributed database table that has a partition specification that is different from a partition specification of an original table on which the replica is based and then routing database queries to either the original table or the replica table based on real-time database performance predictions.

DETAILED DESCRIPTION

Figure 1:
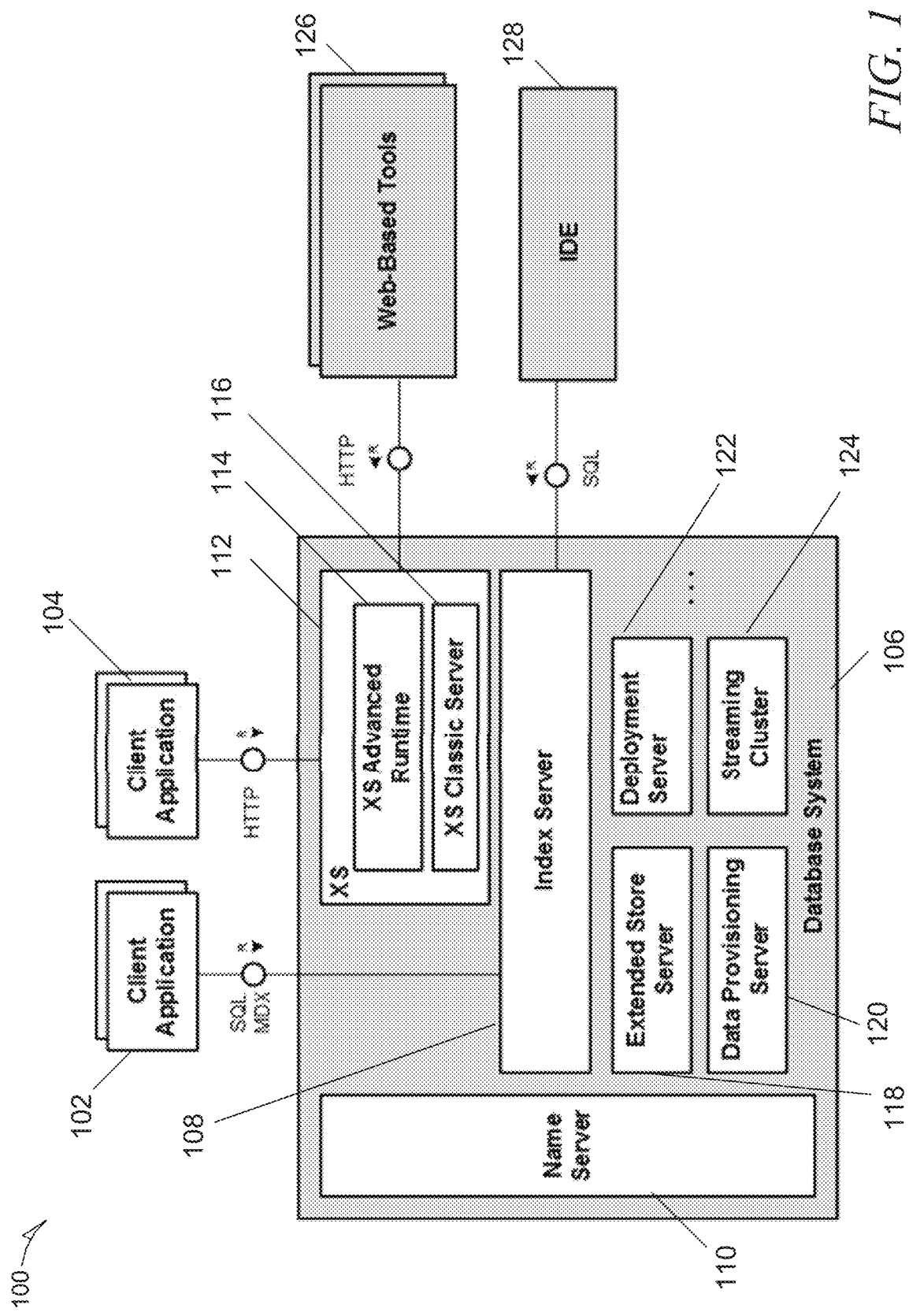
FIG. 1 is a block diagram depicting an example database system environment 100.

In the following description, for purposes of explanation, numerous specific details are set forth in order to provide an understanding of example embodiments of the present subject matter. It will be evident, however, to those skilled in the art that example embodiments may be practiced without these specific details.

If a database table is divided into a plurality of partitions based on a particular database table column, database queries that require read access to rows based on that column can be satisfied by accessing just one of the plurality of partitions. In contrast, database queries that require read access using other database table columns can only be satisfied by accessing all of the plurality of partitions. Thus, the performance of a database system may depend at least partially on access patterns (e.g., which database table columns must be read to satisfy incoming queries).

As a database table grows, requiring scaling up or scaling out, the performance of a database system may deteriorate, especially for a database table having multiple access patterns involving database columns other than the particular column upon which the database table is partitioned. While some performance improvements may be realized through general techniques for improving database performance, such as maintaining database tables in one or more computer memories instead of one or more computer disks, replication of the database table (e.g., to allow load balancing), and so on, such techniques may not be sufficient to achieve the performance goals of various stakeholders associated with the database system.

Consider, for example, a power company that wishes to generate billing documents for millions of customers each month. To generate the billing documents, the power company may execute a computerized billing process on one or more servers. The billing process may, in turn, execute millions of database queries (e.g., over a specific time period) in order to access multiple database table columns pertaining to each customer, including, for example, database table columns that store meter readings pertaining to each customer's electricity usage. These database table columns may include values such as a meter reading document number, equipment number, registration number, scheduled meter reading date, utilities installation, meter reading reason, and so on.

These database table columns may be included in multiple database tables, each of which may be divided into partitions that are distributed across multiple server nodes. For example, meter readings and technical data may be stored in a first database table and billing-related data, such as utility installation data and reasons for meter readings may be stored in a second table. Access to each of the database tables may be most efficient only for the database column by which the table is partitioned (e.g., because only one partition needs to be accessed to satisfy each query pertaining to the database table column). The billing process may then analyze the results to determine billing amounts, payment amounts, payment penalties (e.g., for late payments), and so on, for each customer. The billing process may then generate various billing documents, including invoices, payment reminders, and so on, for communicating to each customer.

Now, consider that the power company wishes to generate the documents more quickly (e.g., instead of generating 30 million invoices over a rolling 30-day period, the power company wishes to generate 30 million invoices in seven days). In some cases, after various general techniques for improving database performance have been applied, the power company's goal may still not have been achieved. The solutions described herein go beyond general techniques for improving database performance. For example, they involve modifying the database system itself and rearchitecting the database tables to improve database performance for one or more client applications. In this way, a customer's back-end processes may be executed even more quickly, such that ever-more-stringent customer requirements may be satisfied.

In example embodiments, one or more modules are incorporated into one or more computer memories, the one or more modules configuring one or more computer processors to perform operations for modifying a database system and modifying database tables to improve performance of the database system.

The operations include generating one or more replication database tables from one or more original database tables. Each replication table has content that is identical to the original table upon which it is based. Each original table divides content into a first plurality of partitions. The dividing of the content into the first plurality of partitions allows a database query of a first type to be satisfied by checking only one of the first plurality of partitions, but allows database queries of a additional types to be satisfied only by checking all of the first plurality of partitions. Each replication table divides the content of the original table upon which it is based into an additional plurality of partitions (e.g., a first replication table divides the content of the original table upon which it is based onto a second plurality of partitions, a second replication divides the content of the original table upon which it is based into a third plurality of partitions, and so on). The dividing of the content into the one or more additional pluralities of partitions allows the database queries of the additional types to be satisfied by checking only one of the additional pluralities of partitions (e.g., dividing the content into a second plurality of petitions allows database queries of a second type to be satisfied by checking only one the second plurality of the partitions, dividing the content into a third plurality of partitions allows database queries of a third type to be satisfied by checking only one of the third plurality of petitions, and so on). Based on receiving the database query of the first type, the original table is used to satisfy the query. Based on receiving a database query of an additional type, the appropriate replication table (and a corresponding one of the additional plurality of partitions) is used to satisfy the query.

In example embodiments, the using of the original table to satisfy the query is further based on a comparison of a predicted performance of satisfying the first type of query using the original table and a predicted performance of satisfying the first type of query using one or more replication tables corresponding to the original table. In example embodiments, the original table and the replication tables corresponding to the original table have identical columns.

In example embodiments, each of the plurality of partitions is distributed across a plurality of computer servers. For example, in example embodiments, a first plurality partitions is maintained on a first computer server and a second plurality of partitions is maintained on a second computer server. In example embodiments, the individual partitions from each of the plurality of partitions are separated and distributed across the plurality of computer servers based on various factors, including access patterns, hardware performance, and so on, in order to maximize database access and query processing performance.

In example embodiments, each of the plurality of partitions is a plurality of hash partitions. For example, a first plurality of hash partitions has a key that corresponds to a column specified in a query of a first type. A second plurality of hash partitions has a key that corresponds to a column specified in a query of a second type. In example embodiments, the column specified in the query of the first type or the second type is specified in a where clause of the query.

FIG. 1 is a block diagram depicting an example database system environment 100. The example database system environment 100 includes a database system 106, which is communicatively coupled (e.g., via a network, such as the Internet, a Wide Area Network (WAN), or a Local Area Network (LAN)) to client applications 102 and 104, web-based tools 126, and integrated development environment (IDE) 128.

The database system 106 may include an index server component 108 that contains data and engines for processing the data. The database system 106 may also include a name server component 110 that owns information about the topology of the database system and, in a distributed system with instances of the database system on multiple hosts, knows where components are running and which data is on which server. The database system 106 may also include an extended application services (XS) component 112 for running database system applications without the need to run an additional application server. The XS component 112 may include an XS classic server 116 that, for example, executes applications written by developers as well as web-based tools, such as lifecycle management and development tools, and an advanced runtime server 114. The XS component 112 may also include an XS Advanced Runtime component 114 that, for example, includes an additional run-time environment for executing advanced application and platform services.

The database system 106 may include an extended store server 118 for providing high-performance disk-based column store for very big data (e.g., in the petabyte range), a data provisioning server 120 that provides capabilities such as data provisioning in real time and batch mode, real-time data transformations, data quality functions, adapters for various types of remote sources, and an adapter SDK for developing additional adapters, a streaming cluster component 124 that provides an event stream processor for consuming data streams and complex event processing, and a deployment infrastructure server 122 that handles deployment of design-time artifacts into the database system.

Although not depicted in FIG. 1, the database system may also include a preprocessor server component that may be used by the index server to analyze text data and extract information on which text search capabilities are based, a compile server component that performs compilation of stored procedures and programs, such as SQLScript procedures; a script server component that is used to execute application function library written in various computer languages (e.g., C++): a web dispatcher component that processes inbound HTTP and HTTPS connections to XS services; and a start service component that is responsible for starting and stopping the other services in the correct order and monitors their runtime state.

In example embodiments, when the XS advanced runtime component 114 is installed, the database system 106 may also include an XS controller that has a view on all deployed and/or running applications and persists configuration and status information in the database; an XS execution agent component that is responsible for managing processes, including starting, keeping alive, and stopping tasks; and an XS user authentication and authorization (UAA) component that manages user logon and logoff requests.

Figure 2:
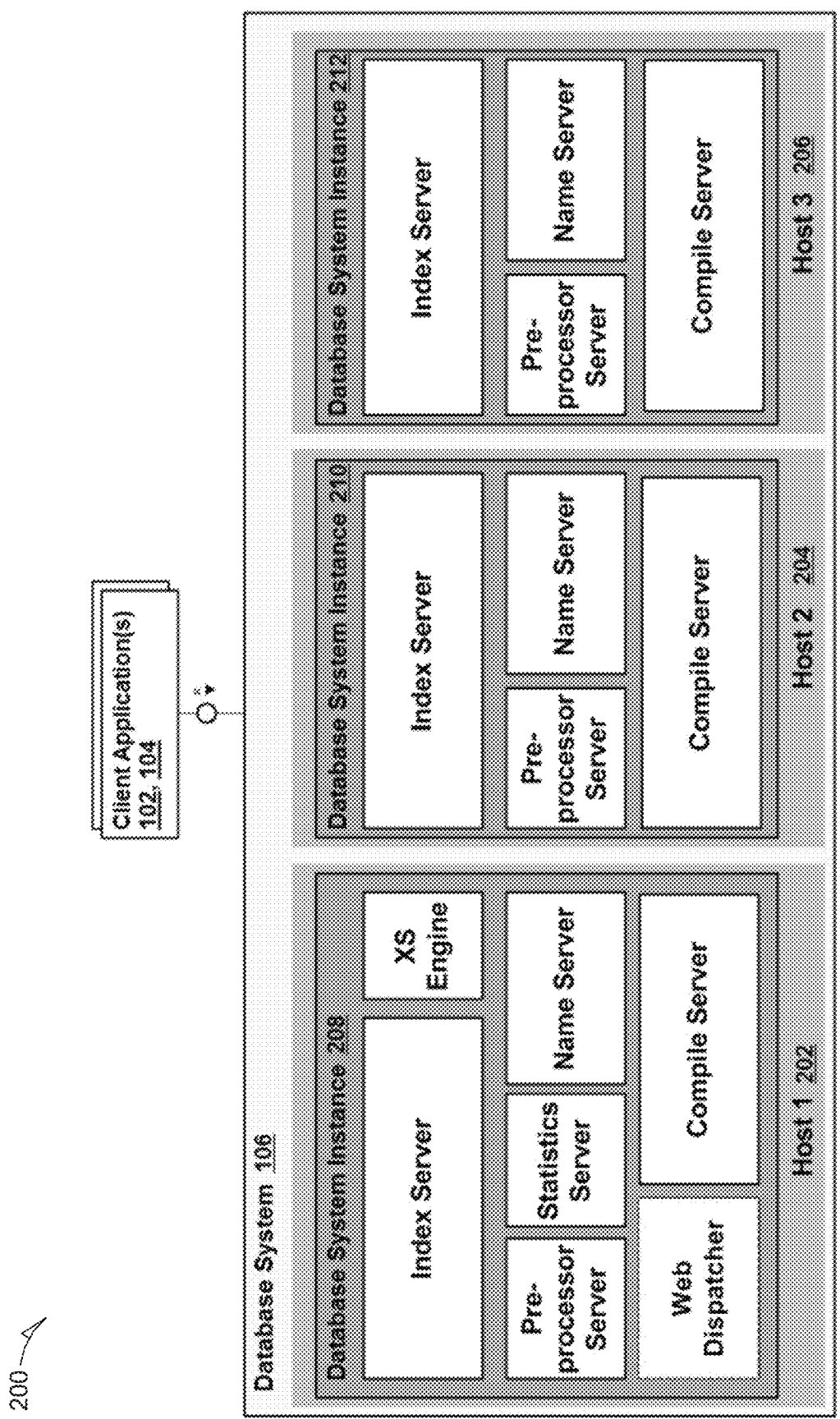
FIG. 2 is a block diagram of an example database system architecture in which server components of the database system of FIG. 1 are distributed across multiple hosts.

FIG. 2 is a block diagram of an example database system architecture 200 in which server components of the database system 106 of FIG. 1 are distributed across multiple hosts (e.g., for scalability and availability).

The database system may be composed of three main components: the host, the system, and the instance. A host is the operating environment in which the database runs. The host provides all the resources and services (CPU, memory, network, and operating system) that the database requires. The storage for an installation does not have to be on the host. For example, for multiple-host systems, a shared storage or a storage that is accessible on-demand from all hosts may be used. A database instance is a set of database system components that are installed on one host. For example, a database instance may be the smallest operational unit on a host. A single-host system contains one instance on one host. A multiple-host system contains several instances distributed across multiple hosts (e.g., one per host). Every system may have an instance number, such as a two-digit identifier. Each instance in a multiple-host system has the same instance number. A database includes one or more instances with the same number. If a database has more than one instance, the instances may be dispersed over several hosts as a multiple-host system. In example embodiments, the term "system" is interchangeable with the term "database."

A multiple-host or distributed database system is a system that is installed on more than one host. (Otherwise, it is a single-host system.) One reason for distributing a system across multiple hosts is scale-out. A multiple-host system can overcome hardware limitations of a single physical server, and it can distribute the load between multiple servers. In a multiple-host system, each index server may be assigned its own host for maximum performance. Additionally, different tables, table replicas, or table partitions may be assigned to different hosts.

A database installed on multiple hosts may be identified by a single system ID (SID). The database may nevertheless be perceived as one unit from the perspective of the administrator, who can install, update, start up, shut down, or backup the system as a whole. The different server components of the database system may share the same metadata. And requests from client applications may be transparently dispatched to different servers in the database system.

A database lifecycle manager tool may be used to install a database as a single or multiple-host system using one or more program interfaces with a combination of one or more parameter specifications.

A multiple-host system can be configured to have active worker hosts and idle standby hosts. In example embodiments, load can be balanced between different hosts. The server software may be installed in a shared file system, which may be mounted by all hosts that are part of the system.

When configuring a multiple-host system, hosts may be defined as worker hosts or standby hosts. Worker machines process data; standby machines do not handle any processing and instead just wait to take over processes in the case of worker machine failure.

An in-memory database may not only be concerned with maintaining the reliability of its data in the event of failures, but also with resuming operations with most of that data loaded back in memory as quickly as possible. Host autofailover may be provided as a local fault recovery solution that is used as a supplemental or alternative measure to system replication. One (or more) standby hosts may be added to the database system, and configured to work in standby mode.

Before installing a multiple-host system, it may be important to consider whether high availability is necessary and how hosts should be grouped to ensure preferred host auto-failover. If the active (worker) host fails, the standby host takes over its role by starting its database instance using persisted data and log files of the failed host. The name server of one of the database instances may act as the cluster manager that pings all hosts regularly. If a failing host is detected, the cluster manager ensures that the standby host takes over the role and the failing host is no longer allowed write access to the files (e.g., the standby host performs fencing) so that the files do not become corrupted. The crash of a single service may not trigger failover since services are normally restarted by a process on the host of the crashed service.

Host grouping does not affect the load distribution among worker hosts because the load is distributed among all workers in the database system. If there are multiple standby hosts in a system, host grouping should be considered, because host grouping decides the allocation of standby resources if a worker machine fails. If no host group is specified, all hosts may be assigned to one host group (e.g., a "default" host group). The more standby hosts in one host group, the more failover security.

If the standby hosts are each in a different host group, the standby host in the same group as the failing worker host may be preferred. If no standby host is available in the same host group, the system may try to fail over to a standby host that is part of another host group. The advantage of this configuration is that in a database system with mixed machine resources, similar-sized machines can be grouped together. If a small worker host fails, and a small standby in the same group takes over, the processes are moved to a machine with similar resources, which allows processing to continue as usual with optimal resource allocation.

Figure 3A:
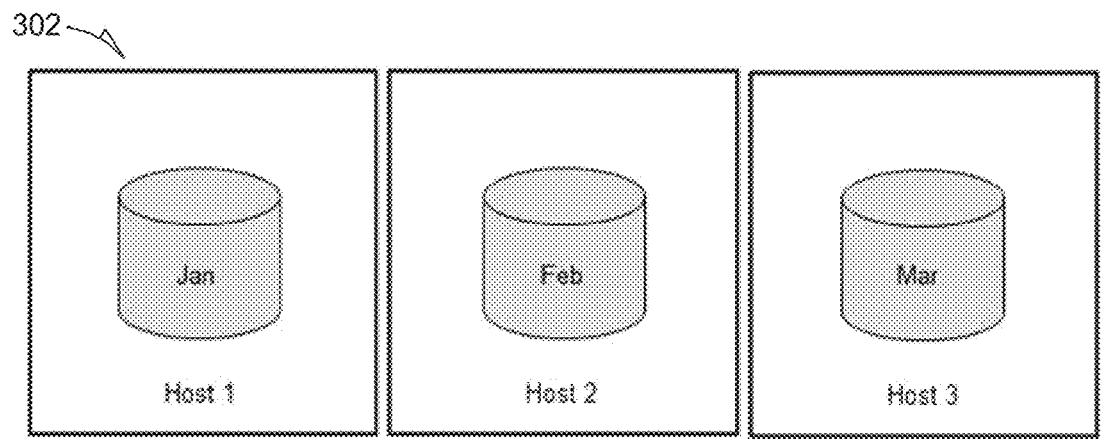
FIG. 3A is a block diagram illustrating an example partition of a database table.

FIG. 3A is a block diagram illustrating an example partition 302 of a database table. Table partitioning splits tables (e.g., horizontally) into disjunctive sub-tables or partitions. In this way, large tables can be broken down into smaller, more manageable parts. Partitioning is typically used in multiple-host systems, but it may also be beneficial in single-host systems. Partitioning may be transparent for SQL queries and data manipulation language (DML) statements. There are additional data definition language (DDL) statements for partitioning itself to, for example, create table partitions, re-partition tables, merge partitions to one table, add or delete partitions, move partitions to other hosts, or perform delta merge operations on certain partitions. When a table is partitioned, the split is done in such a way that each partition contains a different set of rows of the table. There may be several alternatives available for specifying how rows are assigned to the partitions of a table, such as hash partitioning or partitioning by range.

The following paragraphs describe some advantages of partitioning.

Load balancing in a distributed system. Individual partitions can be distributed across multiple hosts. This means that some queries on a table may not be processed by a single server, but by all the servers that host partitions.

Overcoming the size limitation of column-store tables. A non-partitioned table may have a size limitation (e.g., it may be limited to no more than 2 billion rows). It is possible to overcome this limit by distributing the rows across several partitions.

Parallelization. Partitioning may allow operations to be parallelized by using several execution threads for each table.

Partition pruning. Queries are analyzed to determine whether or not they match the given partitioning specification of a table. If a match is found, it is possible to determine the actual partitions that hold the data being queried. Using this method, the overall load on the system can be reduced, thus improving the response time. For example, if a table is partitioned by year, a query restricted to the data of one year is executed only on the partition with data for this year.

Improved performance of a delta merge operation. The performance of a delta merge operation depends on the size of the main index. If data is only being modified on some partitions, fewer partitions will need to be delta merged; therefore, performance will be better.

Explicit partition handling. Applications may actively control partitions, for example, by adding partitions to store the data for an upcoming month.

FIG. 3A illustrates how a table can be distributed over multiple hosts with dedicated partitions for individual months.

When a table is partitioned, its rows may be distributed to partitions according to different criteria known as partitioning specifications. Examples of single-level partitioning specification include round robin, hash, and range partitioning specifications.

Round-robin partitioning may be used to achieve an equal distribution of rows to partitions. However, unlike hash partitioning, partitioning columns do not have to be specified. With round-robin partitioning, new rows are assigned to partitions on a rotation basis. The table must not have primary keys. Hash partitioning may be more beneficial than round-robin partitioning for at least two reasons. First, the partitioning columns cannot be evaluated in a pruning step. Therefore, all partitions are considered in searches and other database operations. Second, depending on the scenario, it is possible that the data within semantically-related tables resides on the same server. Some internal operations may then operate locally instead of retrieving data from a different server.

Hash partitioning is used to distribute rows to partitions equally (e.g., for load balancing or to overcome any row limitations). The number of the assigned partition may be computed by applying a hash function to the value of a specified column. Hash partitioning does not require an in-depth knowledge of the actual content of the table. For each hash partitioning specification, columns are specified as partitioning columns. The actual values of these columns are used when the hash value is determined. If the table has a primary key, at least one of the partitioning columns should be part of the key. The advantage of this restriction is that a uniqueness check of the key can be performed on the local server. As many partitioning columns as required can be used to achieve a good variety of values for an equal distribution.

Range partitioning creates dedicated partitions for certain values or value ranges in a table. This may require in-depth knowledge of the values that are used or valid for the chosen partitioning column. For example, a range partitioning scheme can be chosen to create one partition for each calendar month. Applications may choose to use range partitioning to manage the partitioning of a table actively; that is, partitions may be created or dropped as needed. For example, an application may create a partition for an upcoming month so that new data is inserted into that new partition. The range partitioning specification usually takes ranges of values to determine one partition; for example, 1 to 10. It is also possible to define a partition for a single value. In this way, a list partitioning known in other database systems can be emulated and combined with range partitioning. Range partitioning is similar to hash partitioning in that the partitioning column must be part of the primary key. Range partitioning is also restricted in terms of the data types that can be used. When rows are inserted or modified, the target partition is determined by the defined ranges. If a value does not fit into one of these ranges, an error is raised. If this is not wanted, it is possible to define a rest partition where all rows that do not match any of the defined ranges are inserted. Rest partitions can be created or dropped on-the-fly as desired.

Multi-level partitioning can be used to overcome limitations of single-level hash partitioning and range partitioning; for example, the limitation of only being able to use key columns as partitioning columns. Multi-level partitioning makes it possible to partition by a column that is not part of the primary key.

Figure 3B:
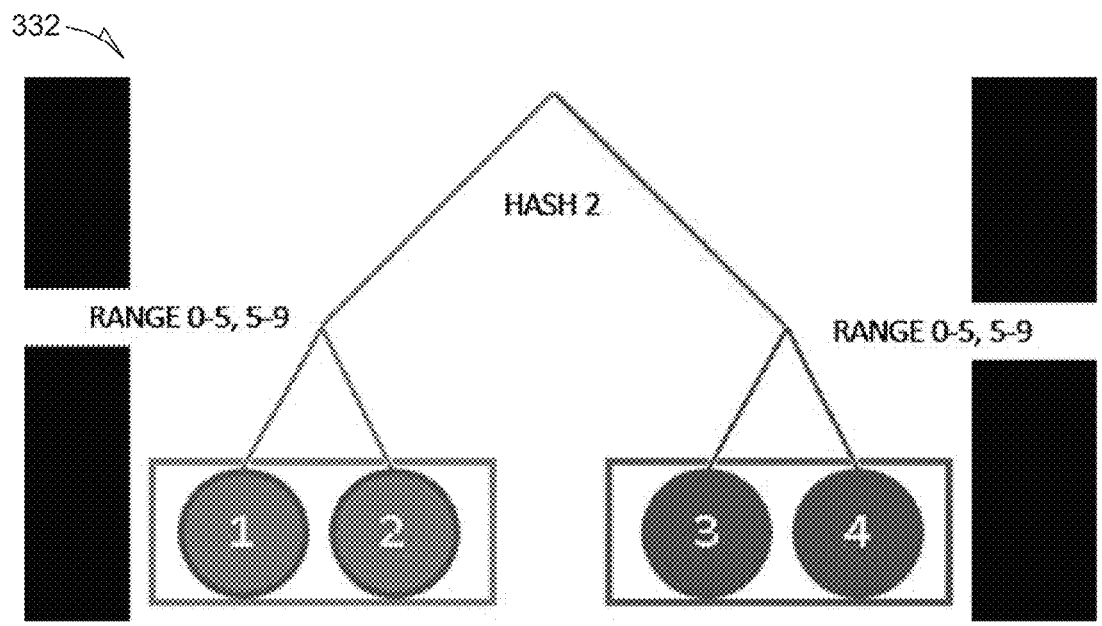
FIG. 3B is a block diagram illustrating an example of how multi-level partitioning can be applied using hash partitioning at the first level and range partitioning at the second level.

FIG. 3B is a block diagram illustrating an example 332 of how multi-level partitioning can be applied using hash partitioning at the first level and range partitioning at the second level. Data in the second level partitions is grouped on the basis of the value of a selected column: rows where the value is below 5 and rows where the value is between 5 and 9. This approach can be used to implement time-based partitioning, for example, to leverage a date column and build partitions according to month or year.

The performance of a merge operation depends on the size of the main index of a table. If data is inserted into a table over time, and it also contains temporal information in its structure (for example, a date), multi-level partitioning may be an ideal candidate. If the partitions containing old data are infrequently modified, there is no need for a delta merge on these partitions. In other words, the delta merge may only be required on new partitions where new data is inserted. Using time-based partitioning in this way, the run-time of the delta merge operation remains relatively constant over time as new partitions are being created and used.

As mentioned above, in the second level of partitioning there is a relaxation of the key column restriction (for hash-range, hash-hash and range-range). When a row is inserted or updated, the unique constraint of the primary key is checked. If the primary key has to be checked on all partitions across the landscape, this would involve expensive remote calls. Therefore, it is advantageous if only local partitions need to be checked. The concept of partition groups exists for this purpose. It allows inserts to occur whilst only requiring primary key checks on local partitions. All corresponding parts of the second level form a group. In the figure above, parts 1 and 2 and parts 3 and 4 each form groups. When a row is inserted into part 1, it is only required to check for uniqueness on parts 1 and 2. All parts of a partition group must reside on the same host. When using SQL commands to move partitions, it may not be possible to move individual parts of partition groups, only partition groups as a whole.

Hash-range multi-level partitioning is another type of multi-level partitioning. Hash partitioning is implemented at the first level for load balancing and range partitioning at the second level for time-based partitioning.

Figure 3C:
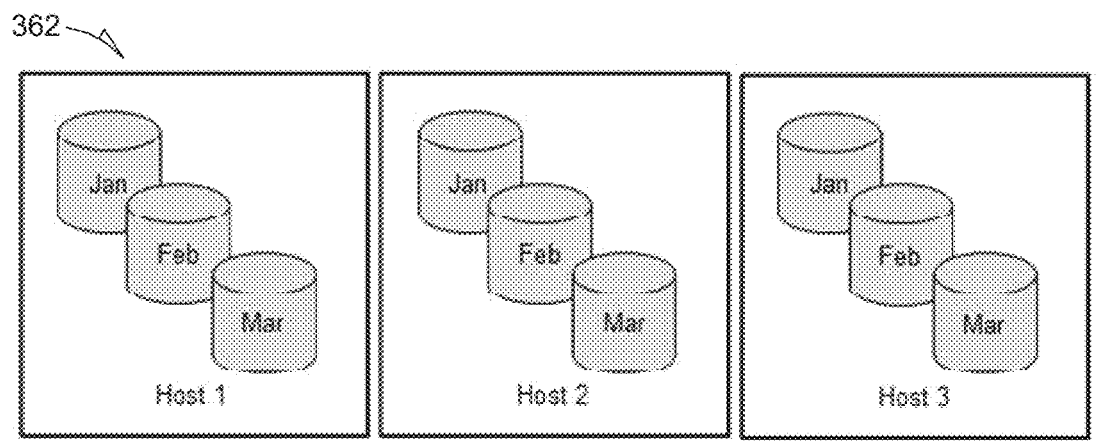
FIG. 3C is a block diagram illustrating an example usage scenario 362 for hash-range multi-level partitioning.

FIG. 3C is a block diagram illustrating an example usage scenario 362 for hash-range multi-level partitioning. Here, the load is distributed to three hosts using hash partitioning. Range partitioning is used at the second level to distribute the data to individual partitions according to month.

Round-robin-range multi-level partitioning is the same as hash-range multi-level partitioning but with round-robin partitioning at the first level. Hash-hash multi-level partitioning is implemented with hash partitioning at both levels. The advantage of this is that the hash partitioning at the second level may be defined on a non-key column. Range-range multi-level partitioning is implemented with range partitioning at both levels. The advantage of this is that the range partitioning at the second level may be defined on a non-key column. If a table needs to be partitioned by month or by year and it contains only a date column or a timestamp column, you can use the date functions to restrict your query results by year or by year and month.

For all partitioning specifications involving range, it is possible to have additional ranges added and removed as necessary. This means that partitions are created and dropped as required by the ranges in use. In the case of multi-level partitioning, the desired operation is applied to all relevant nodes. When you create a rest partition there is a risk that over time it could overflow and require further maintenance. Using the dynamic range feature the rest partition will be automatically split into a second partition when it reaches a pre-defined size threshold.

If hash partitioning is used on a table, a client tries to connect directly with the server that holds the partitions matching the WHERE clause, if possible. For example, if a table is partitioned with Hash partitioning on column A and the following SELECT statement is issued then the client will send the request to the node on which the partition is located for which matches to "A=5" are expected.

SELECT*FROM mytable WHERE A=5

This works only if the columns in the WHERE clause match the partitioning columns and are used in expressions with equality ("=").

This reduces the number of hops between the index servers and may be especially important if you have a transactional (e.g., OLTP) workload. Therefore, a design goal may be to choose a partitioning scheme that matches your queries. This also works for multi-level partitioning if Hash partitioning is used on the first level. In example embodiments, this feature works for either or both of DDL and data manipulation language (DML) queries.

In example embodiments, how a table is partitioned can be determined on creation or at a later point in time. In example embodiments, partitioning can be changed in at least the following ways: change a partitioned table into a non-partitioned table by merging all of its partitions, partition a non-partitioned table, re-partition an already-partitioned table (for example, change the partitioning specification from hash to round-robin), change the partitioning column, or increase or decrease the number of partitions.

Performing a partitioning operation on a table can be costly for the following reasons: it may take a long time to run (e.g., up to several hours for huge tables), it has relatively high memory consumption, it requires an exclusive lock (e.g., only selects are allowed), it performs a delta merge in advance, it writes everything to the log (e.g., as required for backup and recovery).

Figure 4A:
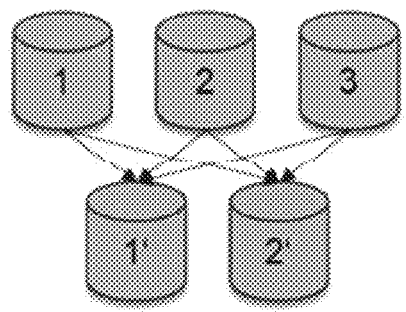
FIG. 4A is a block diagram illustrating a re-partitioning of a table from n to m partitions.
Figure 4B:
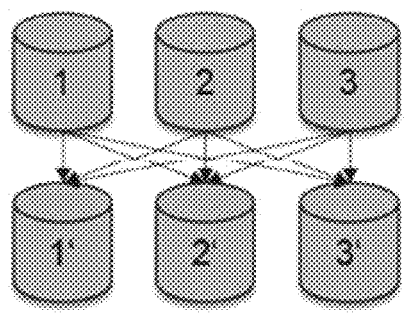
FIG. 4B is a block diagram illustrating a re-partitioning of a table from n to n partitions.
Figure 4C:
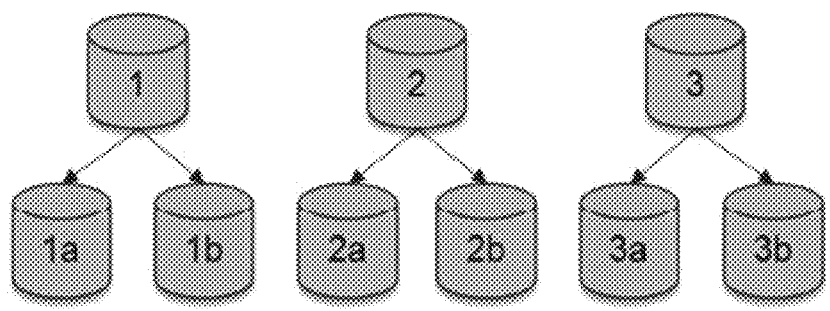
FIG. 4C is a block diagram illustrating a re-partitioning of a table from n to m partitions.

It is possible to re-partition an already-partitioned table in several ways. FIG. 4A is a block diagram illustrating a re-partitioning 402 of a table from n to m partitions. Here, m is not a multiple/divider of n (e.g., from HASH 3 X to HASH 2 X). FIG. 4B is a block diagram illustrating a re-partitioning 432 of a table from n to n partitions. Here, a different partition specification or different partitioning columns are used (e.g., from HASH 3 X to HASH 3 Y). FIG. 4C is a block diagram illustrating a re-partitioning 462 of a table from n to m partitions. Here, m is a multiple/divider of n (e.g., HASH 3 X to HASH 6 X).

In example embodiments, in the first two cases, all source parts must be located on the same host. Up to one thread per column is used to partition or merge the table. In the third case, it is not necessary to move all parts to the same host. Instead, the partition or merge request is broadcast to each host where partitions reside. Up to one thread per column and source part is used. This type of partitioning operation is typically faster as it is always recommended to choose a multiple or divider of the source parts as the number of target parts. This type of re-partitioning is called a parallel partition/merge. In example embodiments, a partitioned table can be changed into a non-partitioned table by merging all of the table's partitions.

Table Replication

In example embodiments, tables in a scale-out system may be replicated to multiple hosts. Table replication may be useful when slowly-changing master data often has to be joined with tables or partitions of other tables that are located on multiple hosts and when it is desirable to reduce network traffic. Advantages of table replication include that joins of small tables with other tables can happen locally on one node, reducing network traffic; different types of processing workloads (e.g., online analytical processing (OLAP) and online transaction processing (OLTP) can be balanced, and accessing of one or more critical tables (e.g., responsible for high resource utilization) can be balanced.

In example embodiments, the database supports two different types of table replication: synchronous table replication (STR) and asynchronous table replication (ATR). Asynchronous (and transactional) table replication allows replication of a table to one or several replicas. The replication happens asynchronously, so the replicas aren't necessarily up to date. The usual replication delay may be small (e.g., significantly less than 1 second), but in case of overload or resource bottlenecks, it may be higher. Synchronous table replication allows replication of a table to one or more several replicas synchronously, which means that the replicas are always in sync with the master table.

STR is a transparent solution that does not require any SQL or application changes. The table replication happens at commit time. With ATR, there can be differences between the source table and the replica table. This can cause issues because the application developer must decide which queries should see the replica tables with the out-dated snapshot and then change the SQL or application.

Synchronous Table Replication is a more transparent solution without any SQL or application changes and with most of the benefits of ATR. In STR, source and replica always have the same state. Therefore, application developers do not need to be aware of existence of replicas. Queries can be routed to the source and replicas evenly and implicitly by the database. On the other hand, there is a performance penalty but only to the write transactions commit operations (DML and read transactions are not affected).

In ATR, there is little overhead at the source node. Replicating updates with less overhead at the source transaction. On the other hand, ATR is not easy to use due to asymmetry between source and replica. Replicas have different (possibly outdated) state than their source tables. This incurs difficulty in its usage model. That is, the source and its replica are not symmetric or equivalent to each other and the application developers should explicitly hint which queries are fine with such staleness.

Status aware routing applies to both synchronous and asynchronous replication. This feature ensures that in a situation where replica tables exist, if replication is disabled then queries are automatically routed to the source table. For asynchronous replication, it may be necessary to query a specific replica table using hints or routing; to do this replication must be enabled.

In example embodiments, a database system has various restrictions that prevent the performance benefits of table replication and the benefits of partitioning to be realized simultaneously. For example, the database system may not support replication of partitioned tables. Or the database system may require a source table and its replica table to have identical table structures and portioning layout.

Figure 5:
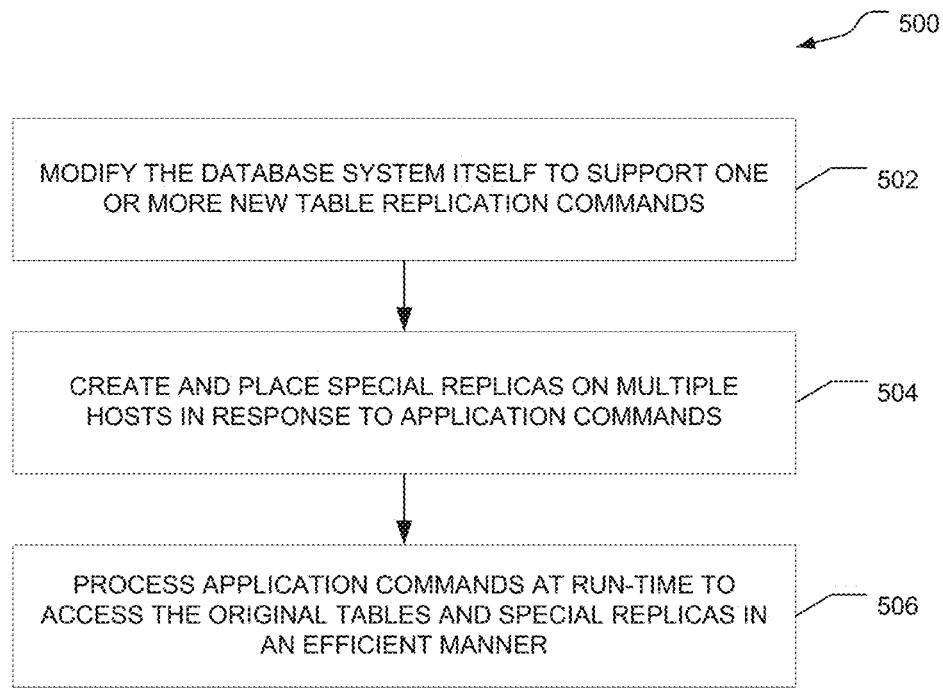
FIG. 5 is flowchart depicting example operations for how a database system itself is modified such that restrictions on table replication are relaxed.

FIG. 5 is flowchart depicting example operations 500 for how the database system itself is modified such that restrictions on table replication are relaxed.

At operation 502, the database system itself is modified to support one or more new table replication commands (e.g., SQL commands). The one or more new table replication commands relax restrictions in the database system pertaining to table structures and partitioning layout of the replicas. In example embodiments, the one or more new table replication commands support creating a table and a special replica table, adding a special replica to an existing table, activating a special replica table, deactivating a special replica table, or dropping special replica tables for a table. Here, the special replica tables include content that is identical to the content of the original table that is replicated. However, the special replica tables may be partitioned differently than the original tables on which they are based. Furthermore, each of the partitions of the special replica tables may be placed or distributed on different hosts than the partitions of the original table. Thus, the one or more new table replication commands may include one or more parameters for specifying a new partition specification and placement scheme for the replicas. In example embodiments, the one or more new commands may be limited to STR only (e.g., such that applications do not require reprogramming).

At operation 504, one or more administration applications may issue one or more of the new table replication commands to create or modify the special replicas. In response to receiving the commands, the database system itself is modified to create the special replicas, implementing a partitioning specification for the special replicas that is different from the original tables (e.g., as defined in one or more parameters received via the one or more new commands), and distributing the special replicas across the multiple hosts associated with the database (e.g., as defined in one or more additional parameters received via the one or more new commands).

At operation 506, one or more client applications may issue one or more commands at run-time to access the database. The database system itself is modified to perform routing of the commands to the original tables or the replica tables based on a predicted execution time of the commands in an efficient manner that is transparent to the one or more applications. If the database system determines that the predicted execution time of the command will be reduced by accessing the hosts on which one or more of the partitions of the replica tables reside, the command will be routed to the one or more partitions of the replica tables. Otherwise, the command will be routed to one or more partitions of the original tables. The predicted execution time may be based on current load of the hosts when the one or more commands are received from the one or more applications.

Figure 6:
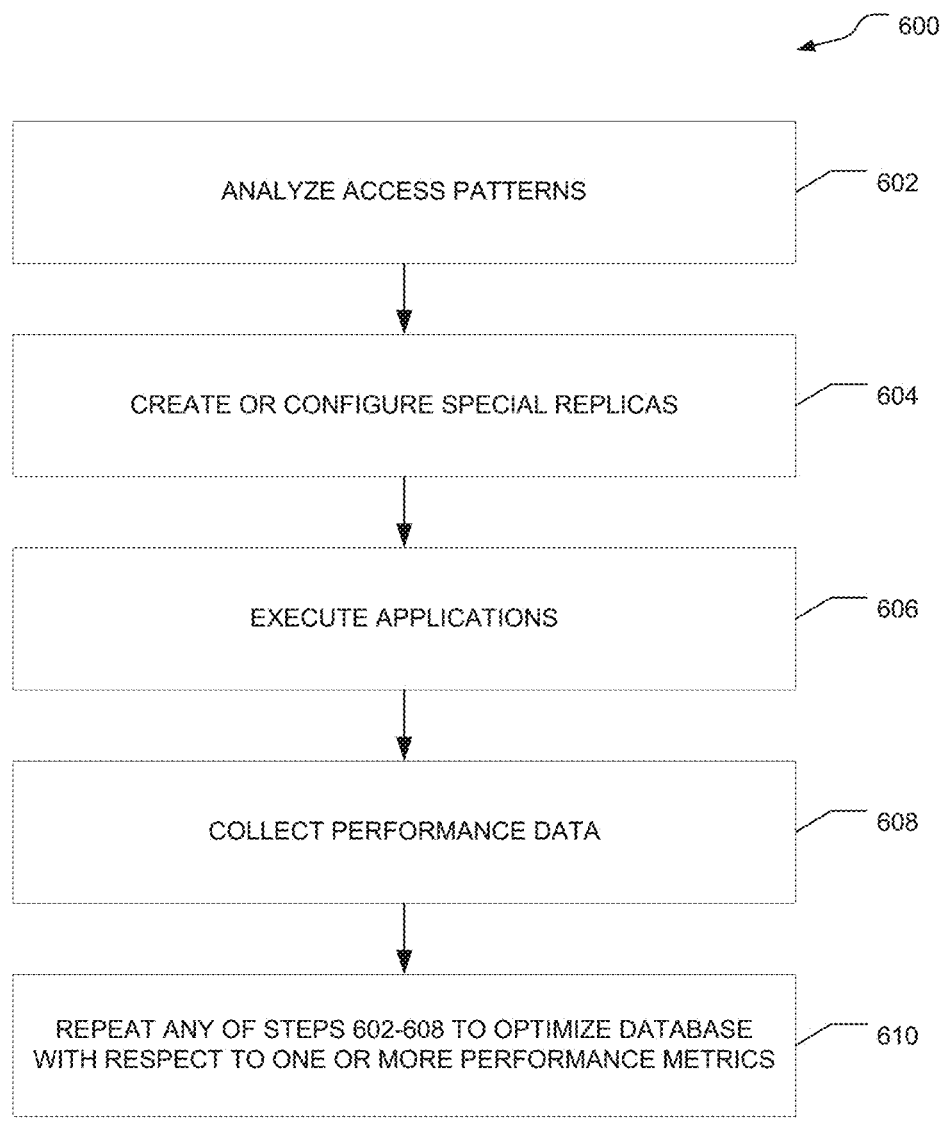
FIG. 6 is a flowchart depicting example operations for how special replicas are created by one or more administration applications and used by one or more client applications.

FIG. 6 is a flowchart depicting example operations 600 for how the special replicas are created by the one or more administration applications and used by one or more client applications such that database performance is optimized for the one or more client applications.

There are a number of factors to consider in creating an optimal design of a data partitioning strategy, including how it will affect select and insert performance and how it will adjust to data changes over time. The modification of the database system to support special replicas allows a data partitioning strategy to be defined for both replicas of original tables and the original tables themselves.

Different partitioning strategies may be tested to determine the best one for a particular scenario. Based on the tests, partitioning strategy may be chosen that shows the best performance for the scenario. The following design principals may be implemented by one or more administration applications to determine the optimal partitioning strategy for a particular scenario.

Query Performance

Partition pruning analyzes the WHERE clauses and seeks to reduce the number of partitions. Therefore, client applications may use partitioning columns that are often used in WHERE clauses based on analyzed access patterns. This reduces run time and load.

Hash partitioning may be the best partitioning scheme for the first level, especially in scale-out scenarios. This is because the client applications may already use pruning on the client machine and send the query directly to the host that holds the data, where possible. This is called "client-side statement routing." This may be especially important for single select statements.

As many columns in the hash partitioning as required may be used for good load balancing, but only those columns that are typically used in requests. In the worst case, only single select statements may leverage pruning.

If tables are joined with each other, it is beneficial if the tables are partitioned over the same columns and have the same number of partitions. In this way, the join may be executed locally in scale out scenarios and the network overhead is reduced. This guarantees that the matching values are in a partition with the same part ID. (Put all parts with the same ID on the same host).

Queries do not necessarily become faster when smaller partitions are searched. Often queries make use of indexes and the table or partition size is not significant. If the search criterion is not selective though, partition size does matter.

DML Performance

If insert performance is key to a scenario, a larger number of partitions might show better results. On the other hand, a higher number of partitions may reduce query performance.

Partition pruning may be used during DML operations.

For replicated column store tables, all DML operations may be routed through the host with the master partition (where the replica with Part ID 1 is located).

If there is a unique constraint on a non-key column, the performance may suffer exponentially with the number of partitions on other servers. This is because the uniqueness on all partitions has to be checked. Therefore, if partitioning is required, a low number of partitions may be used and ideally all partitions will be put on the same host. In this way, the number of remote calls is reduced.

Data Lifecycle

If time-based partitioning is suitable for the dataset being partitioned, it may be used because it has a number of advantages.

The runtime of a delta merge is dependent on the size of the main index. This concept leverages the fact that new data is inserted into new partitions whereas data in old partitions is infrequently updated. Over time, the formerly new partitions become old and new partitions are being created. Therefore, delta merges on old partitions may not be required anymore. In this way, the overall runtime of delta merges does not increase with the table size, but remains at a constant level. Using time-based partitioning often involves the use of hash-range partitioning with range on a date column. This requires knowledge of the actual values for range partitioning.

By using explicit partition management, new partitions can be created, for example, one partition per calendar week and old partitions may be dropped entirely rather than deleting individual rows.

If an index is split, a multiple of the source parts may be used (for example 2 to 4 partitions). In this way, the split may be executed in parallel mode and does not require parts to be moved to a single server first.

Split/merge of a table may be prevented unless necessary. These operations write all data into the log which consumes a high amount of disk space. Moreover, the operations take a long time and locks the table exclusively (only selects are allowed during partitioning operations). If there is no rest partition, a call to add a partition only creates a new partition, which is fast and may happen in real time after an exclusive lock of the table is acquired. On the other hand, if the table has a rest partition, a call to add a partition causes the existing rest partition to be split into a new rest partition and newly requested range. This is a costly operation. Therefore, if calls to add a partition are used frequently in a scenario, the table should not have a rest partition.

Partition Size

A higher number of partitions might lead to higher memory consumption (e.g., each partition may have its own exclusive dictionary, which is not shared). If each partition stores disjunctive values, this is not an issue. On the other hand, if each partition has similar or the same values, this means that the dictionaries have similar data that is stored redundantly. In this case fewer partitions may be used.

Table Design

It may be determined from a data consistency perspective to remove a primary key or to extend the key (since the key constraint is enforced in the source database). In this way, multiple tables with the same partitioning columns are had, even though the original database design would not have allowed it. Having the same partitioning columns may be optimal because related data may reside on the same physical host and therefore join operations may be executed locally with no or hardly any communication costs.

When designing database schemas for dependent hosts (e.g., a database structure for business objects with header and leaf nodes), it may be best to not use a single GUID column as the primary key. In such a case, it may not be possible to have all related data (e.g., a business object instance) on the same host. One option might be to have a GUID as the primary key in the header table, and each host, irrespective of its level, could have that GUID as the first primary key column.

A unique constraint on a partitioned table will not be defined unless absolutely necessary.

On the second partitioning level, a non-primary key column may be used. Still, a unique constraint has to be enforced on all parts of the respective first-level partition. Since all parts of one first-level partition are moved as a whole, this unique check may always be local.

Tables should have a time criterion in the primary key, if possible. This time criterion can then be used for time-based partitioning. Number ranges and so on can also be used. The advantage of number ranges is that it is easy to form equally sized partitions, but on the other hand it introduces an administrative burden the amount of data that is loaded needs to be closely monitored and new partitions need to be created in advance. In case of actual dates, new partitions may only be created periodically, for example, before a new quarter starts.

This checklist demonstrates how a good partitioning scheme may be chosen for given tables, including original tables and replica tables.

Tables of above a predetermined number of rows (e.g., 500 million rows) are good candidates for partitioning. This also applies to small tables that are often joined with tables of above 500 million rows.

If the table has a unique index (other than the primary key), the table may be partitioned, even though the additional unique checks may introduce a performance penalty.

If no primary key exists, any columns may be used for hash partitioning. If a primary key is present, the minimal set of columns are identified that are required to have equally balanced partitions. A sufficiently high number of distinct values is required. If these columns are all in the WHERE clause of a query, partition pruning may be leveraged.

In the case of tables that are replicated, the primary key may be legitimately dropped because it is checked in the source database.

Other tables may be taken into consideration if they are often used in joins with the current table. Ideally, the tables will have the same number of partitions and partitioning columns.

Time-based attributes may be identified, including a date, year or at least a sequence. These time-based attributes may be used for time-based partitioning. Ideally, this column will be part of the primary key.

If range partitioning is defined, a determination of whether to include a rest partition may be made. Ideally, no rest partition is required.

A number of partitions is determined, as well as a table distribution (e.g., based on table classification and table placement rules, such as minimum number of rows that must exist in a table before level 1 partitioning takes place, an initial number of partitions for a table if the minimum rows for partitioning is exceeded, a repartitioning threshold at which a repartitioning is triggered, and a location of the table, such as on types of nodes on which the database or its tables can be stored, such as master, slave, or any type of node).

In a scale-out system, partitions are placed on or move to their respective hosts.

At operation 604, special replica tables are created or configured. For example, one or more administration applications executes one or more of new commands for creating special replica tables having different table structures or partitioning layouts than the original tables on which they are based.

At operation 606, one or more client applications are executed. An example of the one or more client applications is the power company billing applications discussed above, which execute millions of database queries to generate billing documents for millions of customers in a given time period (e.g., one month).

At operation 608, performance data is collected. For example, it is determined how quickly each of the queries pertaining to the one or more client applications is executed.

At operation 610, any of operations 602-604 is repeated to optimize the database performance with respect to one or more performance metrics. For example, extensive performance tests may be run with the most-prominent queries and/or DML load. Partitioning columns, partitioning schemes, and the number of partitions may be changed between tests to determine an optimal partitioning specification for both the original tables and the replica tables.

Figure 7:
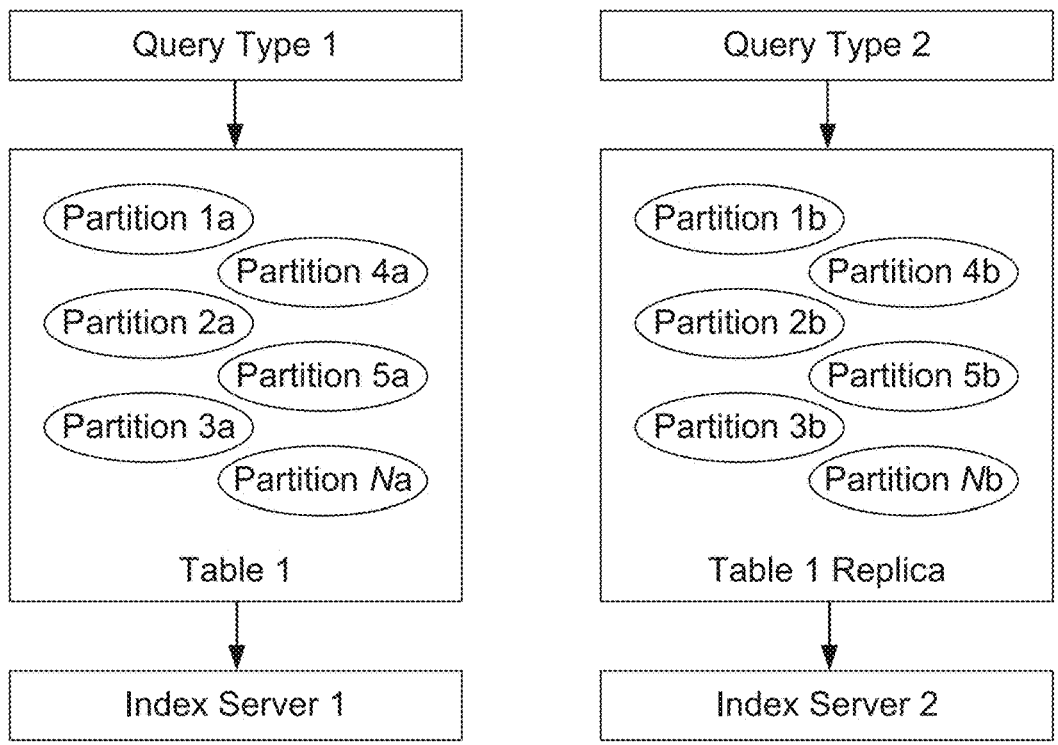
FIG. 7 is a block diagram depicting an example database improvement for one or more client applications.
Figure 7:
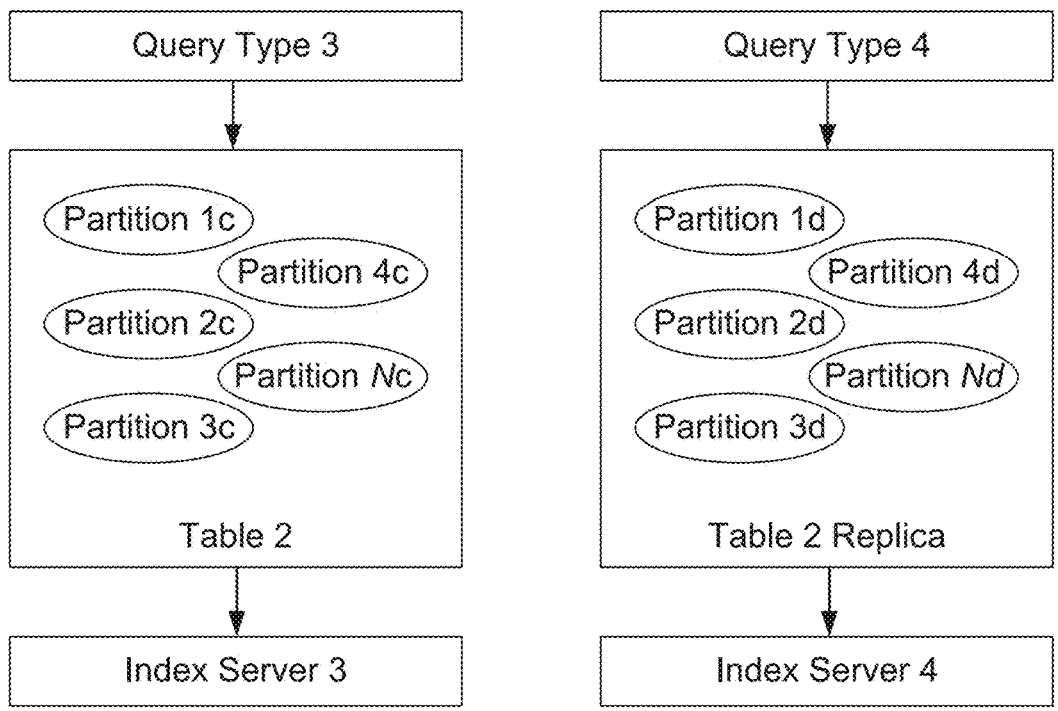

FIG. 7 is a block diagram depicting an example database improvement 700 for one or more client applications. Here, database access patterns for retrieving certain documents (e.g., meter reading documents) involved use of two columns (e.g., foreign keys): EABL-EQUNR and EABLG-ANLAGE. Here, EABL is a first database table (Table 1) that stores meter reading and relevant technical data, EQUNR is a database column holding an equipment number, EABLG is a second database table (Table 2) that stores billing-related data, such as utilities installation, meter reading reason, and so on, and ANLAGE is a database column holding a utilities installation.

In particular, the access pattern includes emphasis on the following queries (e.g., a series of select statements), where ABLBELNR is a table key column holding a meter reading document number.

Select EABL by ABLBELNR+Select EABLG by EABL-ABLBELNR

Select EABL by EQUNR+Select EABLG by EABL-ABLBELNR

Select EABLG by ANLAGE+Select by EABLG-ABLBELNR

Select EABLG by ABLBELNR+Select EABLG-ABL-BELNR

In this example, EQUNR and ANLAGE are not partition keys of either Table 1 or Table 2 (i.e., neither Table 1 nor Table 2 is partitioned by EQUNR or ANLAGE). Thus, if many partitions are used, there will be faster updates and insert, but slower queries via EQUNR resp. ANLAGE. If fewer partitions are used, there will be slower updates and inserts, but faster queries via EQUNR resp. ANLAGE. For example, for the query Select EABL by EQUNR+Select EABLG by EABL-ABLBELNR, fewer partitions means there are less threads for database processing of the select command, which leads to slower updates. And, for the query Select EABLG by ANLAGE+EABLE-ABLBELNR, more partitions means there are more threads for database processing of the select command, which leads to faster updates.

To improve performance, Table 1 Replica and Table 2 Replica are created. These replica tables have identical content to Table 1 and Table 2, respectively. Table 1 and Table 2 are hash partitioned by ABLBELNR. Table 1 Replica is hash partitioned by EQUNR. Table 2 Replica is hash partitioned by ANLAGE. Table 2 also has EQUNR, ABLBELNR, and ZWNUMMER (registration number) as primary keys and Table 2 has ANLAGE, ABLBELNR, and ABLESGR (meter reading reason) as primary keys.

The partitions of each of Table 1 (EABL via ABLBELNR), Table 1 Replica (EABL_SHD via EQUNR), Table 2 (EABLE via ABLBELNR), and Table 2 Replica (EABLG_SHD via ANLAGE) are placed on one or more hosts.

In this configuration, the performance improvement advantage (e.g., 38%) is to be weighed against the disadvantages of higher memory consumption, management of more tables (e.g., synchronization), update of Table 1 and Table 2 taking more time due to additional update of Table 1 Replica and Table 2 Replica, no scale-out solution and no load distribution.

Figure 8:
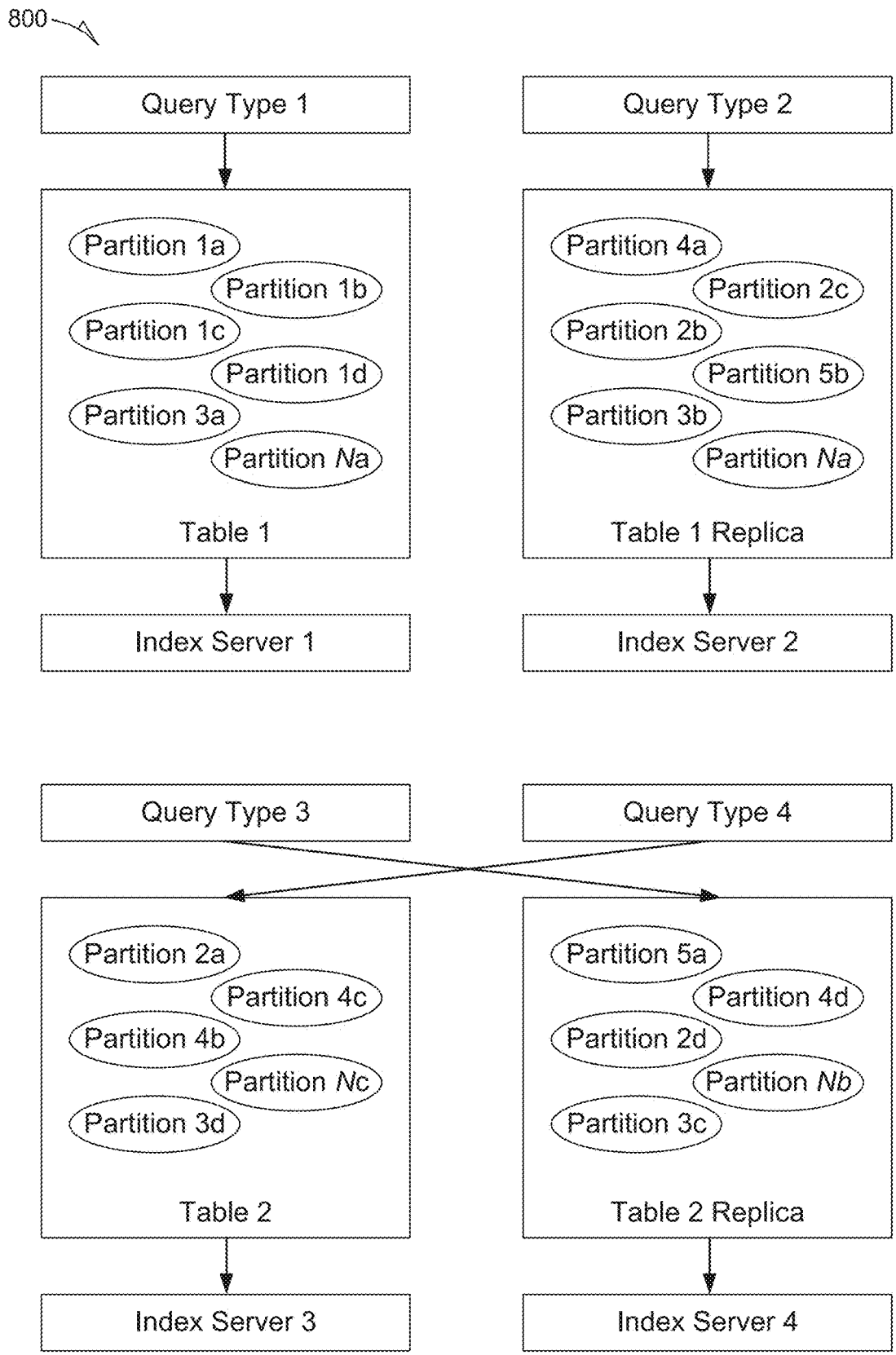
FIG. 8 is a block diagram depicting an additional example database improvement for one or more client applications.
Figure 9:
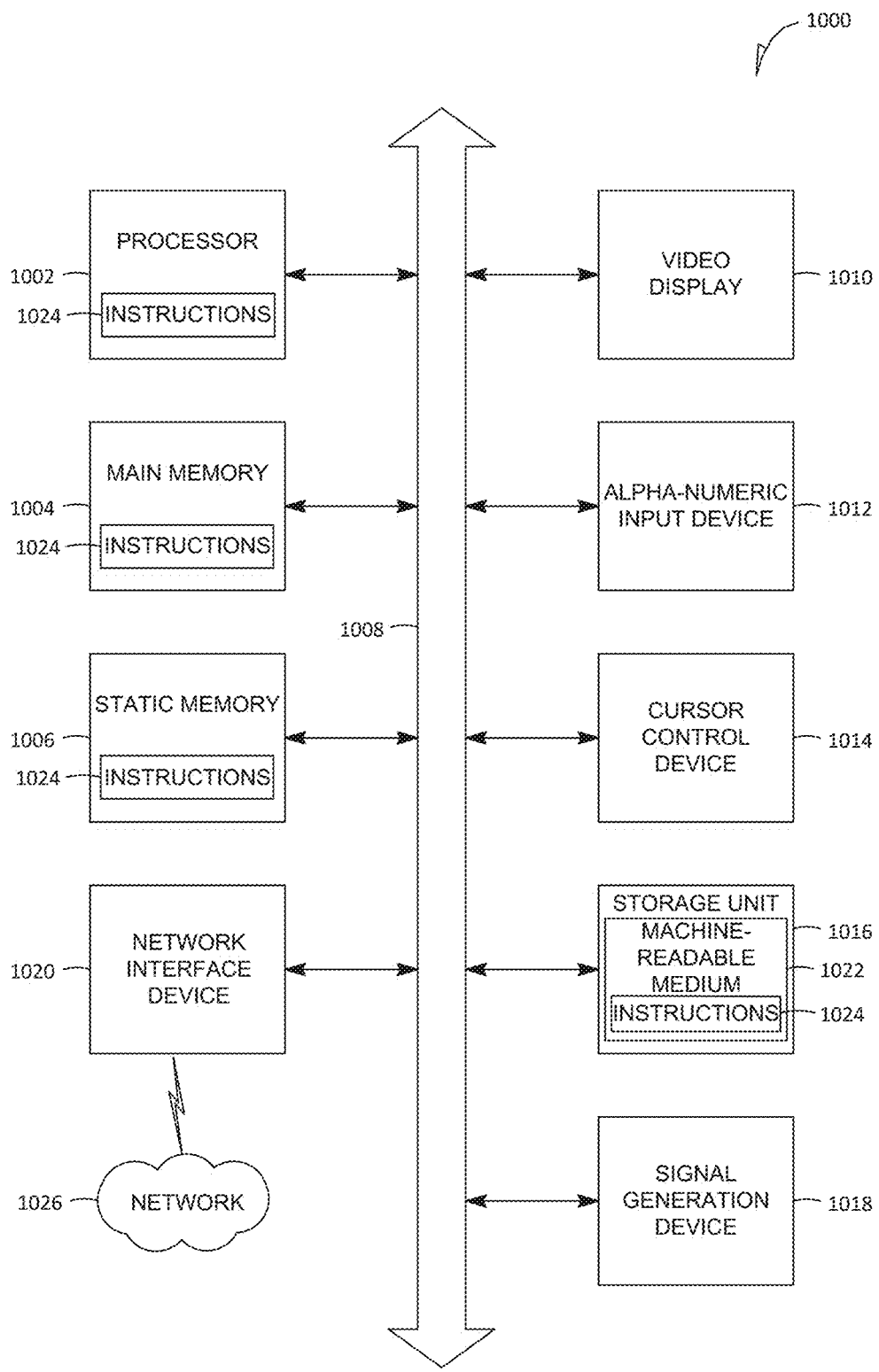
FIG. 9 is a block diagram of a machine in the example form of a computer system within which instructions for causing the machine to perform any one or more of the operations or methodologies discussed herein may be executed.

FIG. 8 is a block diagram depicting an additional example database improvement 800 for one or more client applications. In this example, the partitions for each of the original database tables (e.g., Table 1 and Table 2) and the partitions for each of the replica database tables (e.g., Table 1 Replica and Table 2 Replica) are distributed across multiple hosts. Queries received from the one or more client applications are then routed to the appropriate partition on the appropriate host (e.g., based on predicted execution time, as described above). Therefore, this improvement 800 adds a scale-out solution and a load distribution solution to the example database improvement 700 of FIG. 7. In example embodiments, this configuration may be needed to satisfy the performance requirements of the various stakeholders of the database system.

These methods and the example embodiments disclosed herein may be implemented by a specially-configured computer system. The computer system may be specially configured by one or more modules (e.g., hardware modules or software modules) and implemented by one or more computer processors of the computer system. These methods and the example embodiments disclosed herein may be embodied as instructions stored on a machine-readable medium that, when executed by one or more processors of a computer system, cause the computer system to perform one or more of the operations described herein.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In example embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses that connect the hardware modules). In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the network 102) and via one or more appropriate interfaces (e.g., APIs).

Example embodiments may be implemented in digital electronic circuitry, or in computer hardware, firmware, or software, or in combinations of them. Example embodiments may be implemented using a computer program product (e.g., a computer program tangibly embodied in an information carrier, in a machine-readable medium for execution by, or to control the operation of, data processing apparatus, such as a programmable processor, a computer, or multiple computers).

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., an FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice.

FIG. 6 is a block diagram of machine in the example form of a computer system 1000 within which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a mobile phone (e.g., an iPhone or a mobile phone executing an Android operating system), a web appliance, a network router, a network switch or a network bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU), a graphics processing unit (GPU), or both), a main memory 1004, and a static memory 1006, which communicate with each other via a bus 1008. The computer system 1000 may further include a video display unit 1010 (e.g., a liquid crystal display (LCD) or a cathode ray tube (CRT)). The computer system 1000 also includes an alphanumeric input device 1012 (e.g., a keyboard), a user interface (UI) navigation (or cursor control) device 1014 (e.g., a mouse), a storage unit 1016 (e.g., a disk drive unit), a signal generation device 1018 (e.g., a speaker), and a network interface device 1020.

The storage unit 1016 includes a machine-readable medium 1022 on which is stored one or more sets of instructions and data structures (e.g., software) 1024 embodying or utilized by any one or more of the methodologies or functions described herein. The instructions 1024 may also reside, completely or at least partially, within the main memory 1004 or within the processor 1002 during execution thereof by the computer system 1000, the main memory 1004 and the processor 1002 also constituting machine-readable media. The instructions 1024 may also reside, completely or at least partially, within the static memory 1006.

While the machine-readable medium 1022 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding, or carrying data structures utilized by or associated with such instructions. The term "machine-readable medium" shall accordingly be taken to include, but not be limited to, solid-state memories and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and compact disc-read-only memory (CD-ROM) and digital versatile disc (or digital video disc) read-only memory (DVD-ROM) disks.

Furthermore, the machine-readable medium is non-transitory in that it does not embody a propagating signal. However, labeling the tangible machine-readable medium as "non-transitory" should not be construed to mean that the medium is incapable of movement—the medium should be considered as being transportable from one physical location to another. Additionally, since the machine-readable medium is tangible, the medium may be considered to be a machine-readable device.

The instructions 1024 may further be transmitted or received over a communications network 1026 using a transmission medium. The instructions 1024 may be transmitted using the network interface device 1020 and any one of a number of well-known transfer protocols (e.g., hypertext transfer protocol (HTTP)). Examples of communication networks include LANs, WANs, the Internet, mobile telephone networks, plain olde telephone service (POTS) networks, and wireless data networks (e.g., WiFi and WiMax networks). The term "transmission medium" shall be taken to include any intangible medium capable of storing, encoding or carrying instructions for execution by the machine, and includes digital or analog communications signals or other intangible media to facilitate communication of such software. The network 1026 may be one of the networks 102.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of example embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of example embodiments. Combinations of the above embodiments, and other embodiments not specifically described herein, will be apparent to those of skill in the art upon reviewing the above description.

What is claimed is:

1. A system comprising:
   one or more computer processors;
   one or more computer memories;
   one or more modules incorporated into the one or more computer memories, the one or more modules configuring the one or more computer processors to perform operations for modifying a database architecture to improve database performance, the operations comprising:
   generating a replication table from an original table, the replication table having content in columns that are identical to the original table, the original table dividing the content into a first plurality of partitions, the dividing of the content into the first plurality of partitions allowing a database query of a first type to be satisfied by checking one of the first plurality of partitions, the dividing of the content into the first plurality of partitions allowing a database query of a second type to be satisfied only by checking all of the first plurality of partitions, the replication table dividing the content into a second plurality of partitions, the dividing of the content into the second plurality of partitions allowing the database query of the second type to be satisfied by checking one of the second plurality of partitions, wherein the first plurality of partitions has a first partition specification and the second plurality of partitions has a second partition specification, the first partition specification having a column that corresponds to a column specified in the database query of the first type, the second partition specification having a column that corresponds to a column specified in the database query of the second type, the first plurality of partitions being distributed across a first set of hosts, the second plurality of partitions being distributed across a second set of hosts;
   based on receiving the database query of the first type, using the original table to satisfy the query; and
   based on receiving the database query of the second type, using the replication table to satisfy the query.

2. The system of claim 1, wherein the using of the original table to satisfy the query is further based on a comparison of a predicted performance of satisfying the first type of query using the original table and a predicted performance of satisfying the first type of query using the replication table.

3. The system of claim 1, wherein the original table and the replication table have identical columns.

4. The system of claim 1, the operations further comprising maintaining the first plurality partitions on a first computer server and maintaining the second plurality of partitions on a second computer server.

5. The system of claim 1, wherein the column specified in the query of the first type is specified in a where clause of the query.

6. The method of claim 1, each of the plurality of partitions is a plurality of hash partitions.

7. The method of claim 6, wherein a first plurality of the plurality of hash partitions has a key that corresponds to the database query of the first type.

8. The method of claim 7, wherein a second plurality of the plurality of hash partitions has a key that corresponds to the database query of the second type.

9. The method of claim 1, wherein the column specified in the database query of the first type is specified in a where clause of the database query of the first type.

10. The method of 2, wherein the predicted performance of satisfying the first type of query is based on a load on the first set of hosts.

11. The method of claim 2, wherein the predicted performance of satisfying the second type of query is based on a load on the second set of hosts.

12. A method comprising:
incorporating one or more modules into one or more computer memories, the one or more modules configuring one or more computer processors to perform operations for modifying a database architecture to improve database performance, the operations comprising:
generating a replication table from an original table, the replication table having content in columns that are identical to the original table, the original table dividing the content into a first plurality of partitions, the dividing of the content into the first plurality of partitions allowing a database query of a first type to be satisfied by checking one of the first plurality of partitions, dividing of the content into the first plurality of partitions allowing a database query of a second type to be satisfied only by checking all of the first plurality of partitions, the replication table dividing the content into a second plurality of partitions, the dividing of the content into the second plurality of partitions allowing the database query of the second type to be satisfied by checking one of the second plurality of partitions, wherein the first plurality of partitions has a first partition specification and the second plurality of partitions has a second partition specification, the first partition specification having a column that corresponds to a column specified in the database query of the first type, the second partition specification having a column that corresponds to a column specified in the database query of the second type, the first plurality of partitions being distributed across a first set of hosts, the second plurality of partitions being distributed across a second set of hosts;
based on receiving the database query of the first type, using the original table to satisfy the query; and
based on receiving the database query of the second type, using the replication table to satisfy the query.

13. The method of claim 12, wherein the using of the original table to satisfy the query is further based on a comparison of a predicted performance of satisfying the first type of query using the original table and a predicted performance of satisfying the first type of query using the replication table.

14. The method of claim 12, wherein the original table and the replication table have identical columns.

15. The method of claim 12, the operations further comprising maintaining the first plurality partitions on a first computer server and maintaining the second plurality of partitions on a second computer server.

16. The method of claim 12, wherein the column specified in the query of the first type is specified in a where clause of the query.

17. A non-transitory machine readable storage medium storing a set of instructions that, when executed by at least one processor of one or more machines, cause the one or more machines to perform operations for modifying a database architecture to improve database performance, the operations comprising:
generating a replication table from an original table, the replication table having content in columns that are identical to the original table, the original table dividing the content into a first plurality of partitions, the dividing of the content into the first plurality of partitions allowing a database query of a first type to be satisfied by checking one of the first plurality of partitions, dividing of the content into the first plurality of partitions allowing a database query of a second type to be satisfied only by checking all of the first plurality of partitions, the replication table dividing the content into a second plurality of partitions, the dividing of the content into the second plurality of partitions allowing the database query of the second type to be satisfied by checking one of the second plurality of partitions, wherein the first plurality of partitions has a first partition specification and the second plurality of partitions has a second partition specification, the first partition specification having a column that corresponds to a column specified in the database query of the first type, the second partition specification having a column that corresponds to a column specified in the database query of the second type, the first plurality of partitions being distributed across a first set of hosts, the second plurality of partitions being distributed across a second set of hosts;
based on receiving the database query of the first type, using the original table to satisfy the query; and
based on receiving the database query of the second type, using the replication table to satisfy the query.

18. The non-transitory machine readable storage medium of claim 17, wherein the using of the original table to satisfy the query is further based on a comparison of a predicted performance of satisfying the first type of query using the original table and a predicted performance of satisfying the first type of query using the replication table.

19. The non-transitory machine readable storage medium of claim 17, wherein the original table and the replication table have identical columns.

20. The non-transitory machine readable storage medium of claim 17, the operations further comprising maintaining the first plurality partitions on a first computer server and maintaining the second plurality of partitions on a second computer server.

* * * * *